(12) United States Patent
Tajima et al.

(10) Patent No.: US 6,452,302 B1
(45) Date of Patent: Sep. 17, 2002

(54) ROTARY ELECTRIC MACHINE AND ELECTRIC VEHICLE USING THE SAME

(75) Inventors: Fumio Tajima, Jyuo-machi (JP);
Yutaka Matsunobu, Hitachi (JP);
Shouichi Kawamata, Hitachi (JP);
Suetaro Shibukawa, Hitachinaka (JP);
Osamu Koizumi, Ibaraki-machi (JP);
Takashi Kobayashi, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/400,437

(22) Filed: Sep. 21, 1999

(30) Foreign Application Priority Data

Sep. 28, 1998 (JP) .......................... 10-273307
Feb. 1, 1999 (JP) .......................... 11-024349

(51) Int. Cl.⁷ .................... H02K 19/06; H02K 19/02
(52) U.S. Cl. .................... 310/216; 310/168; 310/261
(58) Field of Search .................... 310/156, 166, 310/168, 216, 217, 218, 261, 262, 264; 29/596–598

(56) References Cited

U.S. PATENT DOCUMENTS

| | | | | |
|---|---|---|---|---|
| 485,220 A | * | 11/1892 | Pepper | 310/216 |
| 1,314,132 A | * | 8/1919 | Dorsely | 310/216 |
| 3,652,889 A | * | 3/1972 | Reece et al. | 310/259 |
| 3,999,093 A | * | 12/1976 | Kirtley, Jr. | 310/198 |
| 4,888,513 A | * | 12/1989 | Fratta | 310/216 |
| 5,304,882 A | * | 4/1994 | Lipo et al. | 310/156 |
| 5,583,387 A | * | 12/1996 | Takeuchi et al. | 310/217 |
| 5,811,904 A | * | 9/1998 | Tajima et al. | 310/156 |
| 5,838,087 A | * | 11/1998 | Tang | 310/168 |
| 5,903,080 A | * | 5/1999 | Nashiki et al. | 310/168 |
| 6,049,153 A | * | 4/2000 | Nishiyama et al. | 310/156 |

FOREIGN PATENT DOCUMENTS

| | | | |
|---|---|---|---|
| JP | 361112549 | * | 5/1986 |
| JP | 363217941 | * | 9/1988 |
| JP | 9-74713 | | 3/1997 |
| JP | 410210688 | * | 8/1998 |

OTHER PUBLICATIONS

*Journal of Electrical Engineers of Japan* (Jun. 1996), pp. 694–700 entitled "A magnetic field analysis of a flux barrier type reluctance motor using a slit rotor and tests using a prototype" by Masayuki Nashiki et al.

* cited by examiner

*Primary Examiner*—Tran Nguyen
(74) *Attorney, Agent, or Firm*—Crowell & Moring LLP

(57) ABSTRACT

An rotary electric machine 1 comprises stator 2 having a stator core 4 wounded with stator windings 5 and a rotor 3 having a rotor core 7 rotatable and opposite to the stator core 4 through a gap. The rotor core 4 of the roraty electric machine 1 is composed of a plurality of projecting pole magnetic core portions 73 arranged in a side of the gap and along the circumferential direction and a plurality of rotor yoke portions 76 for forming a magnetic path conducting magnetic fluxes of each of the projecting pole magnetic core portions 73, and the rotor core is divided in the circumferential direction on a unit of each of the projecting pole magnetic core portions 73 and each of the rotor yokes 76 opposite to each of the projecting pole magnetic core portions 73. It is possible to provide a rotary electric machine which is high in material use factor at manufacturing a rotor core and small in size and light in weight, and to provide an electric vehicle using the rotary electric machine.

9 Claims, 9 Drawing Sheets

MAGNETIC FLUX

ROTARY ELECTRIC MACHINE AND ELECTRIC VEHICLE USING THE SAME

BACKGROUND OF THE INVENTION

The present invention relates to a rotary electric machine which has high rotor core material use factor while being small in size and light in weight, and to an electric vehicle using the rotary electric machine.

It is desired that motor used for an electric drive vehicle be small in size, light in weight and high in efficiency. Making the size of a motor small can be attained by rotating the motor at high speed. From this viewpoint, drive motors suitable for an electric vehicle such as an electric car, a battery forklift or the like are, firstly, a motor of a permanent magnet type and, secondly, a brushless motor using reluctance. Particularly, the reluctance motor is inferior in efficiency and torque to a magnet motor using a high performance magnet, but is nearly equivalent to a magnet motor using a ferrite magnet. The reluctance motor, however, has an advantage in that there are no problems such as temperature dependence of the characteristic, demagnetization of the magnet. Further, the motor is economical and practical.

A reluctance motor of the prior art is described in an article entitled "A magnetic field analysis of a flux barrier type reluctance motor using a slit rotor and tests using a prototype", Journal of Electrical Engineers of Japan (June, 1996). The motor has a structure such that the rotor is formed by laminating magnetic plates such as silicon steel plates in the axial direction and the rotor is formed using silicon steel plates in an integrated body.

The conventional technology described above is advantageous in that the material use factor at manufacturing the stator core is improved since the stator core is divided, but is disadvantageous in that the material use factor of the rotor is poor since the rotor is formed in a single body. The central core portion of the rotor, particularly in the flat shaped rotor, is practically unnecessary because the magnetic flux density at that portion is low. Since the portion is, however, filled with the material, a quantity of the material for forming the rotor is increased and accordingly the weight of the motor is increased.

In addition to this, the increase in the weight becomes a large load for the electric vehicle or the electric drive car.

On the other hand, Japanese Patent Application Laid-Open No. 9-74713 discloses a permanent magnet type rotary electric machine in which the bearing and the differential gear are arranged inside the rotor by increasing the inner diameter of the rotor to make the motor compact.

The above-mentioned technology does not investigate the shapes of the rotor and the stator, and particularly the optimized value for the inner diameter of the rotor is not shown.

When the inner diameter of the rotor is increased, the weight of the rotor itself is decreased and accordingly the weight of the motor (the rotor and the stator) becomes lighter. In addition, it becomes easy to arrange the bearing and the like inside the inner portion of the rotor. However, when the distance r between the permanent magnet and the inner diameter of the rotor is small, the magnetic flux density is decreased by interfering with the flow of the magnetic flux. Therefore, there is a disadvantage in that the weight of the motor is increased since the laminating thickness needs to be increased in order to keep the output power high even if the gap magnetic flux density is decreased.

In recent years, the permanent magnet type rotary electric machine has been increasingly used for a drive motor of a hybrid electric vehicle. Since the hybrid electric vehicle needs to mount a drive motor, a battery and an engine, weight reduction is the most important problem, and weight reduction of the drive motor is an important problem as a matter of course.

SUMMARY OF THE INVENTION

An object of the present invention is to provide a rotary electric machine which has a high material use factor during manufacturing of the rotor core, while being and small in size and light in weight, and to provide an electric vehicle using the rotary electric machine.

Another object of the present invention is to provide a permanent magnet type rotary electric machine capable of reducing the weight of the motor without decreasing the output power of the motor.

In order to attain the above-mentioned objects, a feature of a rotary electric machine in accordance with the present invention is that a rotor core comprising a plurality of projecting poles arranged in a side of a gap and along the circumferential direction and a plurality of rotor yokes for forming a magnetic path conducting magnetic fluxes of each of the projecting poles is divided in the circumferential direction in a unit of each of the projecting poles and each of the rotor yokes opposite to each of the projecting poles.

In more detail, the present invention provides the following rotary electric machines.

The present invention provides a rotary electric machine comprising a stator having a stator core wound with stator windings; and a rotor having a rotor core rotatable and arranged opposite the stator core through a gap, wherein the rotor core comprises a plurality of projecting poles arranged in a side of the gap and along the circumferential direction; and a plurality of rotor yokes for forming a magnetic path conducting magnetic fluxes of each of the projecting poles, and the rotor core is divided in the circumferential direction on a unit of each of the projecting poles and each of the rotor yokes opposite to each of the projecting poles.

It is preferable that a position of the division is at each middle position of the width in the circumferential direction of the projecting poles.

Further, the present invention provides a rotary electric machine comprising a stator having a stator core wound with stator windings; and a rotor having a rotor core rotatable and arranged opposite to the stator core through a gap, wherein the rotor core comprises a plurality of permanent magnets arranged and embeded therein in a side of the gap and along the circumferential direction; and a plurality of rotor yokes for forming a magnetic path conducting magnetic fluxes of each of the permanent magnets, and the rotor core is divided in the circumferential direction in a unit of each pole of the permanent magnets and each of the rotor yokes opposite to each pole of the permanent magnets.

It is preferable that a position of the division is at each position between the poles of the permanent magnets.

It is preferable that the rotor core is made of a different material from the material of the stator core.

Furthermore, the present invention provides an electric vehicle comprising a battery for supplying electric power; a rotary electric machine for outputting drive torque to drive the vehicle by the supplied electric power; and a controller for controlling the drive torque, wherein the rotary electric machine comprises a stator having a stator core wound with stator windings; and a rotor having a rotor core rotatable and arranged opposite to the stator core through a gap, and the rotor is formed of a rotor core divided in the circumferential direction in a unit of each magnetic pole and a holding member having an I-shaped cross section for holding the rotor core, the holding member having an I-shaped cross section being disposed on an inner peripheral side of the rotor core in order to lengthen a driving distance per charge of the vehicle by reducing the vehicle weight.

Further, in order to attain the above-mentioned objects, a feature of a permanent magnet type rotary electric machine in accordance with the present invention is that the relation r/w≈0.6±0.1 is satisfied where r is a distance in a radial direction from an inner radial surface of the rotor core to a side end portion between poles of an inner peripheral surface of each of the permanent magnets, and 2·w is a length in the circumferential direction of the permanent magnet.

In more detail, the present invention provides the following rotary electric machines.

The present invention provides a permanent magnet rotary electric machine comprising a stator having a stator core wound with stator windings; and a rotor having a rotor core arranged opposite to the stator core through a rotation gap, a plurality of permanent magnets being arranged and embeded in the rotor core in the circumferential direction, wherein the relation r/w≈0.6±0.1 is satisfied where r is a distance in a radial direction from an inner radial surface of the rotor core to a side end portion between poles of an inner peripheral surface of each of the permanent magnets, and 2·w is a length in the circumferential direction of the permanent magnet.

Further, the present invention provides a permanent magnet rotary electric machine comprising a stator having a stator core wound with stator windings; and a rotor having a rotor core arranged opposite to the stator core through a rotation gap, a plurality of permanent magnets being arranged and embeded in the rotor core in the circumferential direction, the rotor core having a plurality of die-cut holes in the circumferential direction between an inner radial surface of the rotor core and an inner peripheral surface of the permanent magnets, wherein the relation t/w≈0.6 is satisfied where t is a distance in a radial direction from the permanent magnet side of each of the die-cut holes to a side end portion between poles of an inner peripheral surface of each of the permanent magnets, and 2·w is a length in the circumferential direction of the permanent magnet. Therein, the words "radial direction" means a direction from the center of a shaft of the rotor core toward the outer diameter of the rotor core, as to be described in the section of DESCRIPTION OF THE PREFERRED EMBODIMENTS.

DESCRIPTION OF THE PREFERRED EMBODIMENTS

Embodiments of rotary electric machines in accordance with the present invention and an electric vehicle using the rotary electric machine will be described below, referring to the accompanied drawings.

Figure 1:
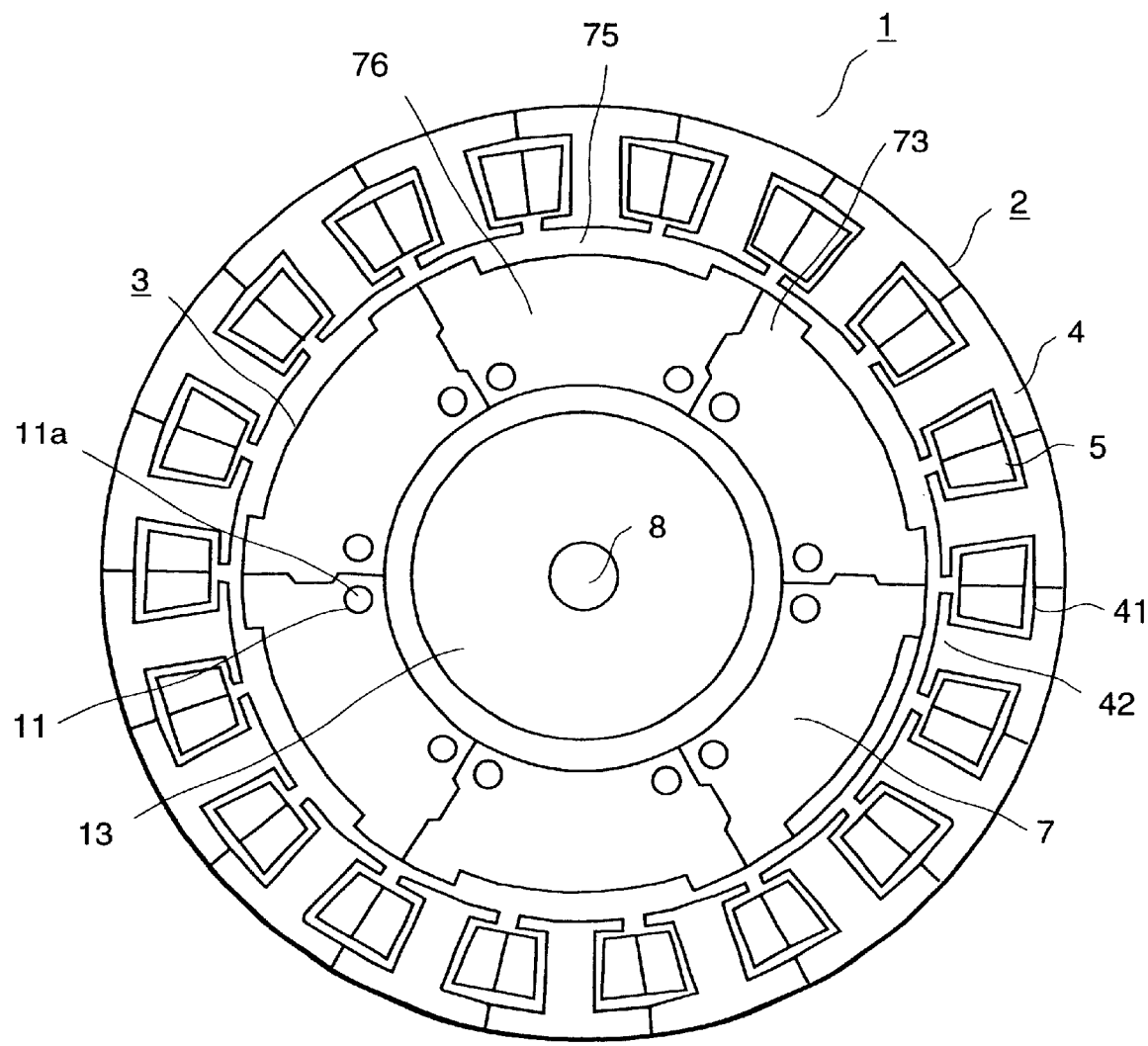
FIG. 1 is a view showing a cross section in a direction perpendicular to a shaft direction of an embodiment of a rotary electric machine in accordance with the present invention.
Figure 2:
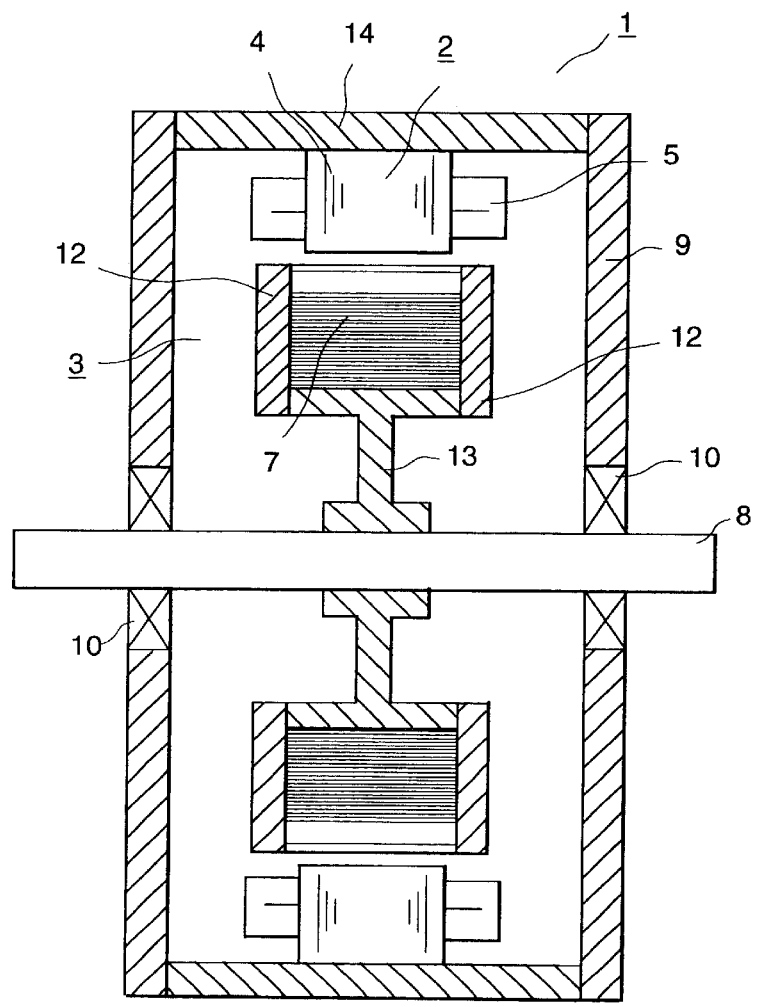
FIG. 2 is a view showing a cross-section in the shaft direction of the rotary electric machine of FIG. 1.

FIG. 1 shows a cross section in a direction perpendicular to a shaft direction of an embodiment of a rotary electric machine in accordance with the present invention, and FIG. 2 shows a cross-section in the shaft direction of the rotary electric machine of FIG. 1.

In an example of a feature of this embodiment, a reluctance motor having a rotor of a lumped wound winding structure will be described. As shown in FIG. 1 and FIG. 2, the rotary electric machine 1 is composed of a stator 2, a rotor 3, end brackets 9 and a housing 14.

The stator 2 is composed of a stator core 4 formed of a magnetic body by laminating, for example, silicon steel plates in the shaft direction and stator windings 5. Therein, the stator core 4 has a structure of being divided into eighteen parts in the circumferential direction, and each section of the stator core 4 is composed of an annular stator yoke portion 41 and a core magnetic pole 42. Each of the core magnetic poles 42 is wound with a stator winding 5.

On the other hand, the rotor 3 is composed of a rotor core 7 formed of a magnetic body by laminating, for example, silicon steel plates in the shaft direction and a rotor shaft 8. The rotor core 7 has a structure of being divided into six sections in the circumferential direction, and has projecting pole core portions 73 each forming a center of a projecting pole and depressed core portions 75 in the side of a gap between the rotor core 7 and the stator core 4. Further, a rotor core yoke portion 76 forming magnetic flux paths of the projecting pole core portions 73 is disposed in the rotor core in the opposite side of the gap.

The depressed core portions 75 may be filled with a non-magnetic material such as vanish or resin or a non-magnetic conductive material such as aluminum.

The present invention is characterized by that the rotor core 7 being divided into a plurality of sections in the circumferential direction.

Figure 3:
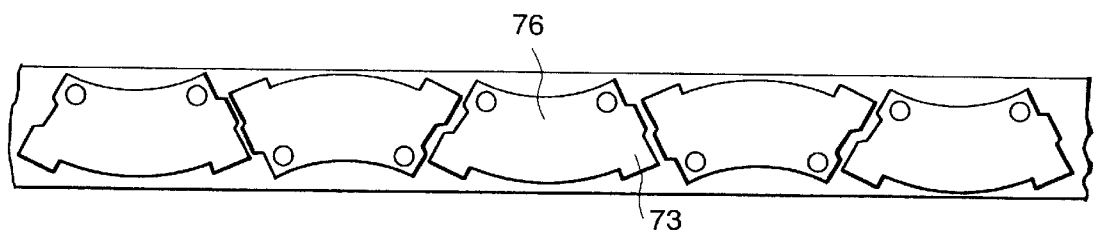
FIG. 3 is a view showing an example of die-cutting rotor cores from a silicon steel plate.

FIG. 3 shows an example of die-cutting the rotor cores 7 from a silicon steel plate of a core material. As shown in FIG. 3, the silicon steel plate is die-cut in a staggered configuration alternatively placing the projecting pole core portion 73 in the gap side of the rotor core and the rotor core yoke portion 76 composing the magnetic path of fluxes of the projecting pole in the opposite side of the gap.

By cutting the silicon steel plate in such a manner, the quantity of the silicon steel plate of a core material used can be reduced, particularly in a case of a motor having a large inner diameter rotor core. Thrown-away portions of the plate silicon steel for die-cutting the rotor cores become small, as shown in the figure, and accordingly the use factor of material at manufacturing the rotor core 7 can be improved.

In this embodiment, the rotor core is divided in the unit of single magnetic pole and at the middle position of width in the circumferential direction of the each projecting pole core portion 73.

The reason why the rotor core is divided at the middle position of width in the circumferential direction of the each projecting pole core portion 73 is that the gap formed in the divided surfaces produces a better characteristic of the reluctance motor. In other words, the characteristic of the reluctance motor is better as the ratio of the reluctance Xd at the middle position of the width in the circumferential direction of the each projecting pole core portion 73 to the reluctance Xq at each position between the projecting pole core portions 73 is larger. Therefore, the gap between the divided surfaces produces a similar effect as that of the rotor core depressed portion 75 in the magnetic circuit of the q-axis, which decreases the reluctance Xq at the each position between the projecting pole core portions 73. Thereby, the characteristic of the reluctant motor can be improved.

Of course, the rotor core 7 may be divided in the unit of two magnetic poles or in the unit of three magnetic poles.

It can be suggested that the mechanical strength of the rotor 3 including the rotor core 7 may be decreased by dividing the rotor core. The mechanical strength of the rotor core 7 can be reinforced by forming holes 11 at each position between the projecting pole core portion 73 and in the inner peripheral portion of the projecting pole core portion 73, and inserting an axial direction fastening and supporting member 11a such as a rivet or a bolt into each of the holes 11 to fix both ends of the axial direction fastening and supporting member 11a to both of-side plates 12 of the rotor.

The weight of the rotor 3 can be reduced by placing a solid holding member having an I-shaped cross section 13 in the inner periphery of the rotor core 7, as shown in FIG. 2. This structure is effective particularly in a flat shaped motor. That is, since the inner peripheral portion of the rotor core 7 is large and the magnetic flux density in that portion is low, the portion is useless for the magnetic circuit. Therefore, by employing the structure described above, the quantity of material used for the rotor core can be reduced, and the inner diameter of the rotor can be increased up to a magnetically allowable position, and accordingly the weight of the motor can be reduced.

In the above-mentioned structure, an effect different from the above-mentioned effect can be attained by changing the material forming the rotor core 7 from that of the stator core 4. For example, when an iron loss of the core in the stator portion is large, a low iron-loss material is used for the stator core and a relatively higher iron-loss material is used for the rotor.

The relationship between saturation magnetic flux density and iron loss of a core is in a reversed relation, that is, a high iron-loss material has a high saturation magnetic flux density and a low iron-loss material has a low saturation magnetic flux density. Therefore, it is possible to obtain a motor having a desired property by selecting which is required, high efficiency or small size.

In regard to solely the iron loss, the same effect described above can be obtained by changing the thickness of the magnetic plates of the rotor core 7 and the stator core 4. The iron loss can be reduced by the thickness of the magnetic plates, but there are disadvantages in that number of the magnetic plates per core and number of the manufacturing processes are increased, and that the mechanical strength of the core is decreased. Therefore, it is possible to obtain a high performance rotary electric machine by changing the thickness of the magnetic plates depending on necessity.

Figure 4:
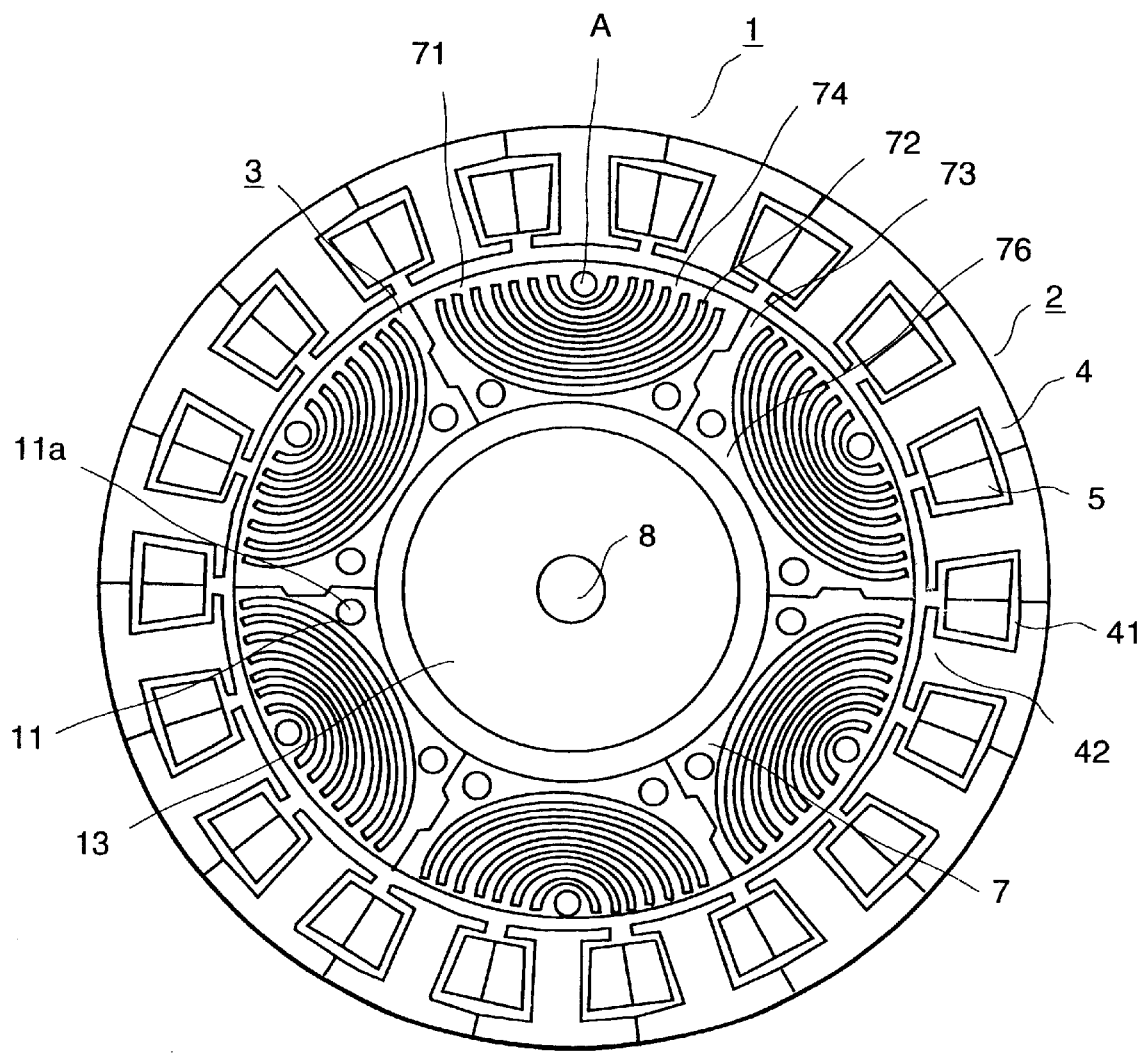
FIG. 4 is a view showing a cross section in the direction perpendicular to the shaft direction of another embodiment of a rotary electric machine in accordance with the present invention.

FIG. 4 shows a cross section in the direction perpendicular to the shaft direction of another embodiment of a rotary electric machine in accordance with the present invention. This embodiment is an example of a reluctance motor having a rotor core with slits. Therein, parts having a similar function are identified by the reference characters as in FIG. 1.

The rotor 3 is composed of a rotor core 7 formed of a magnetic body by laminating, for example, silicon steel plates in the shaft direction and a rotor shaft 8. The rotor core 7 has a shape such that a plurality of arc-shaped slits 72 are arranged concentrically in the circumferential direction with respect to a hole A as the center, and a bridge 74 is concentrically arranged between the slits 72 in an arc shape similarly to the slits 72.

The bridges 74 are connected to each other in the peripheral portion with an outer peripheral bridge 71. That is, the rotor core has a structure capable of withstanding the centrifugal force of the rotor 3 by the bridges to prevent the rotor core from being broken.

In this embodiment, the rotor core 7 is composed of projecting pole core portions 73 disposed in the outer peripheral side of the rotor core 7 and rotor core yoke portions 76 forming magnetic flux paths of the projecting pole core portions 73, and the rotor core 7 is divided into six sections in the circumferential direction in the unit of the projecting pole core portion 73 and the rotor core yoke portion 76.

By the structure described above, the same advantages as in the structure shown by FIG. 1 can be displayed, and the eight of the rotor core 7 can be further reduced by existence of the slits 72.

Figure 5:
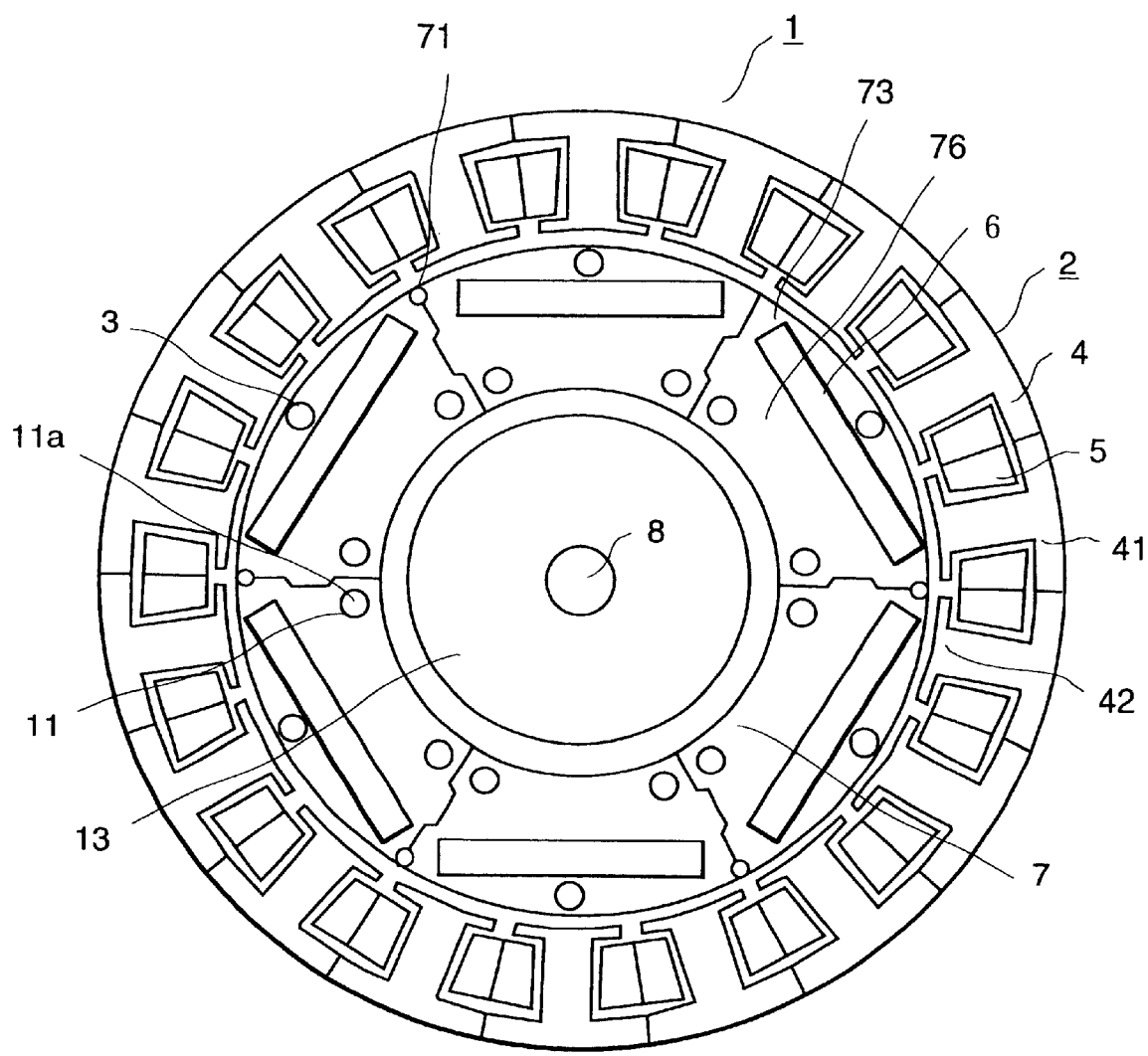
FIG. 5 is a view showing a cross section in the direction perpendicular to the shaft direction of a further embodiment of a rotary electric machine in accordance with the present invention.

FIG. 5 shows a cross section in the direction perpendicular to the shaft direction of a further embodiment of a rotary electric machine in accordance with the present invention. This embodiment is an example of a so-called permanent magnet rotary electric machine of an inner magnet type in which permanent magnets 6 are embedded the rotor core 7.

As shown in FIG. 5, the stator 2 of the rotary electric machine 1 has completely the same structure as that in FIG. 1. On the other hand, the rotor is composed of a rotor core 7 formed of a magnetic body, for example, silicon steel plates and a rotor shaft 8. The rotor core 7 has permanent magnet inserting holes in which permanent magnets are inserted and placed. Further, projecting magnetic core portions 73 formed integrally with the rotor core 7 are arranged in both sides of the permanent magnets 6 in the circumferential direction.

In this embodiment the rotor core 7 is composed of the projecting magnetic pole core portion 73 placed in the outer peripheral side of the rotor core 7. The permanent magnets 6 are contained in the rotor core 7. The rotor core yoke portions 76 form magnetic flux paths conducting in the projecting magnetic pole core portion 73 and the permanent magnets 6. The rotor core 7 is divided into six sections in the circumferential direction in the unit of the projecting pole core portion 73 and the rotor core yoke portion 76.

Since the permanent magnet rotary electric machine of an inner magnet type having the above-described structure can use reluctance torque by the projecting pole core portion 73 as well as torque by the permanent magnets 6, a high torque and high efficiency rotary electric machine can be obtained.

In this embodiment, the rotor 2 is formed of units of single pole, and the units of single pole are connected through the outer diameter bridges 71. Further, the units of single pole are assembled by being wound in one turn, and the dividing position of the rotor core 7 is selected at each of the projecting pole core portions 73 between the permanent magnets 6.

In this case, the rotor core 7 may be also divided in the unit of two magnetic poles or in the unit of three magnetic poles.

It can be suggested that the mechanical strength of the rotor 3 including the rotor core 7 may be decreased by dividing the rotor core. Similarly to FIG. 1, the mechanical strength of the rotor core 7 can be reinforced by forming holes 11 at each position between the projecting pole core portion 73 and in the inner peripheral portion of the projecting pole core portion 73, and inserting an axial direction fastening and supporting member 11a such as a rivet or a bolt into each of the holes 11 to fix both ends of the axial direction fastening and supporting member 11a to both of side plates 12 of the rotor.

The weight of the rotor 3 can be reduced by placing a solid boss (solid holding member having an I-shaped cross section) 13 in the inner periphery of the rotor core 7. Therefore, by employing the structure described above, the quantity of material used for the rotor core can be reduced, and the weight of the motor can be reduced.

Figure 6:
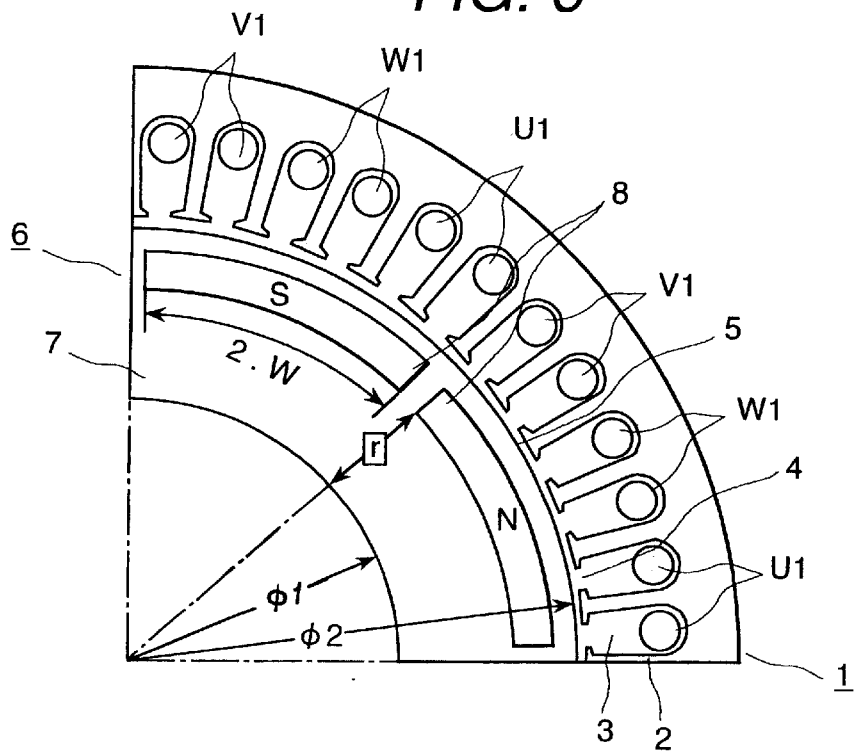
FIG. 6 is a view showing the structure of anther embodiment of a permanent magnet type rotary electric machine in accordance with the present invention.

FIG. 6 shows one pole pair of another embodiment of a permanent magnet type rotary electric machine of three-phase 8-poles/48-slots in accordance with the present invention. Referring to FIG. 6, the structure of the stator 1 is the same as in a conventional stator, the stator 1 is formed by inserting and placing stator windings U1 for U-phase, stator windings V1 for V-phase and stator windings W1 for W-phase to 48 slots 3 formed in the nearly annular stator core 2. Opening portions 4 are formed corresponding to the slots in the inner periphery of the stator core.

On the other hand, the rotor 6 is constructed by press-fitting the rotor core, forming containing portions formed by die-cut in the circumferential direction in the outer peripheral portion of the rotor core, and inserting permanent magnets 8 made of magnetized neodymium into the containing portions from the shaft direction so that the N-pole and the S-pole are alternatively arranged.

The rotor 6 is rotatably disposed in a state having a predetermined gap between the outer periphery of the rotor core 7 and the inner periphery of the stator core 2. The rotor core 7 is constructed by laminating many silicon steel plates which have holes for forming the containing portions.

Let an inner radius of the rotor core 7 be $\phi_1$, a distance in the radial direction (a direction from the shaft center of the rotor core toward the outer radius of the rotor core) from the inner diameter surface of the rotor core 7 to a side end portion between the poles of the inner peripheral surface of the permanent magnet 8 be r, and a length of the permanent magnet in the circumferential direction be 2·w. Therein, when the outer radius $\phi_2$ of the rotor core 7 is constant, the value w becomes a constant value.

When the inner radius $\phi_1$ of the rotor core 7 is increased, that is, the value r is decreased, the weight of the motor (the rotor and the stator) is decreased since the amount of iron in the rotor is reduced.

Figure 7:
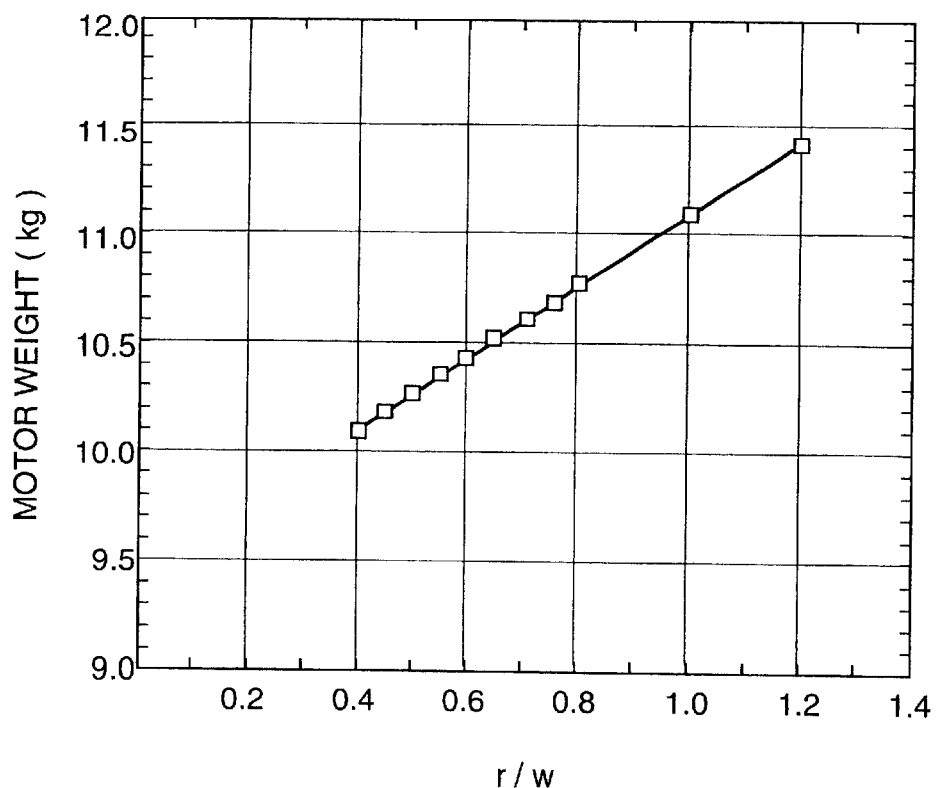
FIG. 7 is a graph showing the relationship between ratio r/w and weight of the motor of the permanent magnet type rotary electric machine of FIG. 6.

FIG. 7 shows the relationship between ratio r/w and weight of the motor of the permanent magnet type rotary electric machine of FIG. 6. The permanent magnet type rotary electric machine in this case is of 17 kW output, 187 mm outer diameter of the stator, 180 A input current and 160 V input voltage.

It can be understood from FIG. 7 that the motor weight can be reduced by decreasing the ratio r/w. However, the magnetic fluxes of the permanent magnet become difficult to flow when the value r is too small.

Figure 8:
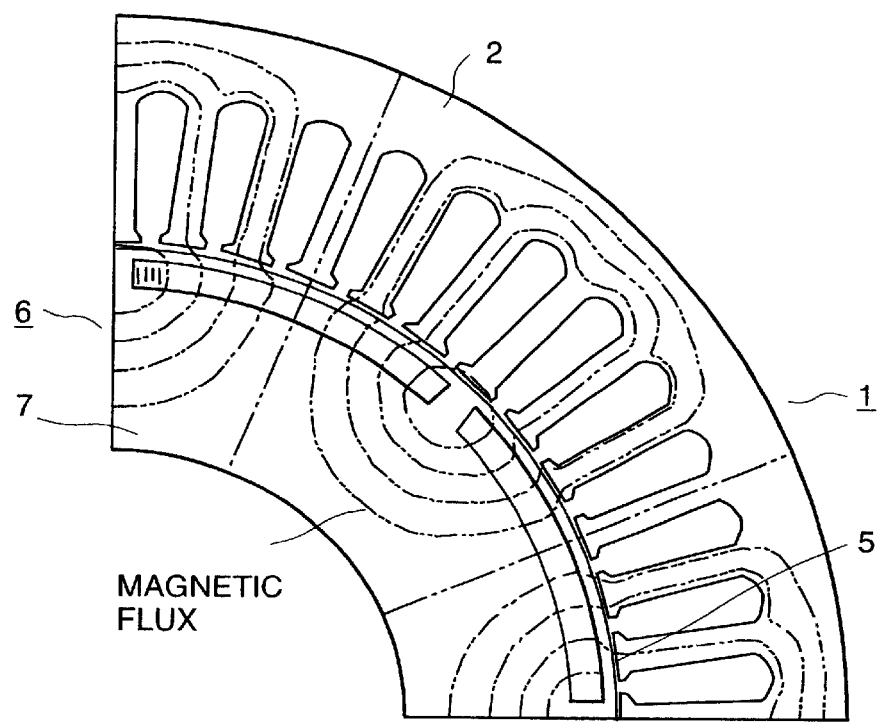
FIG. 8 is a view showing an analytical result of the magnetic field of the permanent magnet type rotary electric machine of FIG. 6.

FIG. 8 shows an analytical result of the magnetic field of the permanent magnet type rotary electric machine of FIG. 6. Looking at the magnetic flux flow in the inner diameter side of the rotor 7 in FIG. 8, the magnetic fluxes flowing out from the surface of 2·w length in the circumferential direction of the permanent magnet 8 are divided into two flows of the magnetic fluxes each for w length with respect to the boundary of magnet center to be respectively absorbed into the adjacent permanent magnets 8 having the opposite polarity in the both sides.

When the distance r in the radial direction from the inner diameter surface of the rotor core 7 to a side end portion between the poles of the inner peripheral surface of the permanent magnet 8 is larger than the value w, that is, r/w>1, the magnetic flux flow is smooth. However, when r/w<1, the magnetic flux density in the gap 5 is decreased because the magnetic flux flow becomes uneven.

Figure 9:
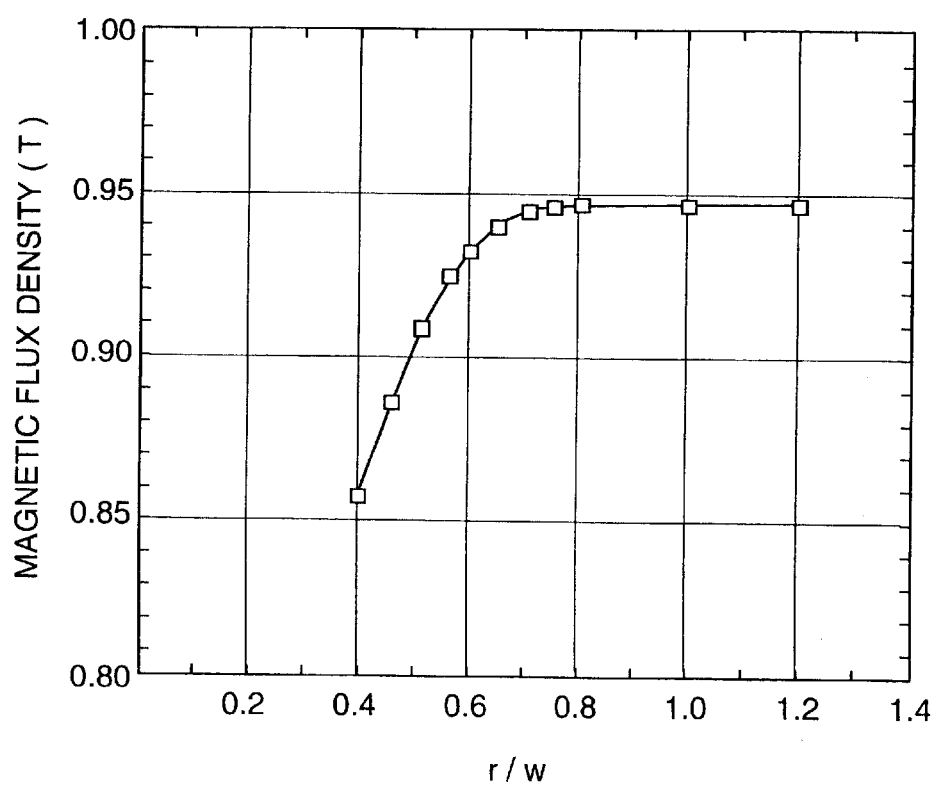
FIG. 9 is a graph showing the relationship between ratio r/w and magnetic flux density in the gap of the permanent magnet type rotary electric machine of FIG. 6.

FIG. 9 shows the relationship between ratio r/w and magnetic flux density in the gap of the permanent magnet type rotary electric machine of FIG. 6. Referring to FIG. 9, the magnetic flux density B is nearly constant within the range of r/w>0.8, but the magnetic flux density B rapidly decreases in r/w<0.8. As the magnetic flux density B decreases, the output power of the motor is decreased. Since the laminating thickness of the cores must be increased in order to keep the output power constant, the motor weight is increased.

Figure 10:
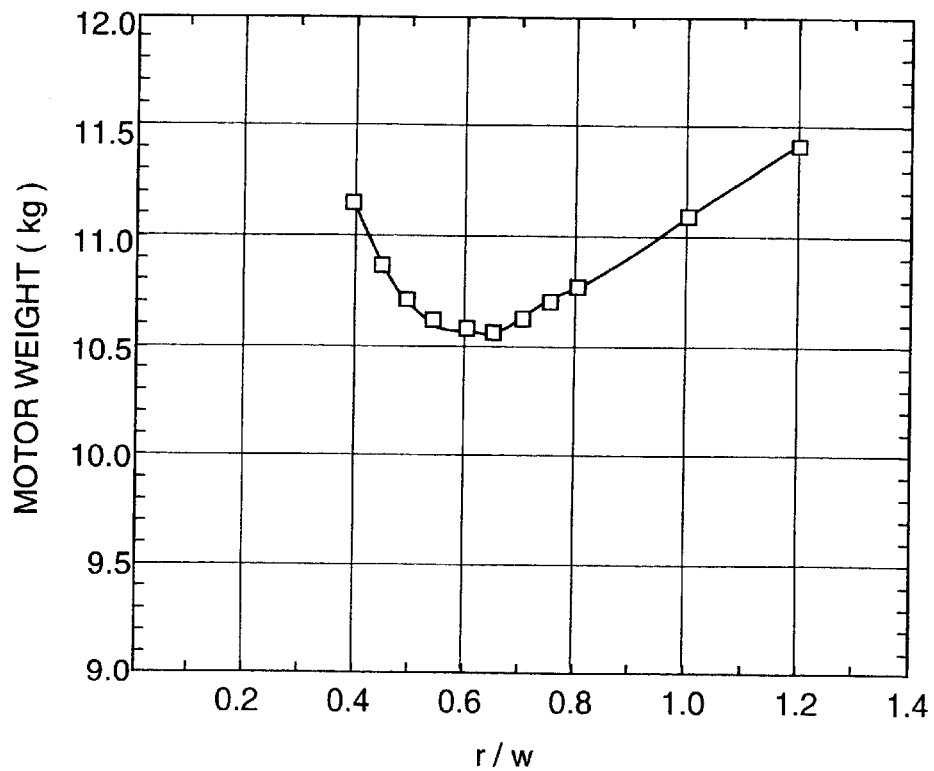
FIG. 10 is a graph showing the relationship between ratio r/w and weight of the motor of the permanent magnet type rotary electric machine of FIG. 6 under a condition of a constant output power.

FIG. 10 shows the relationship between ratio r/w and motor weight of the permanent magnet type rotary electric machine of FIG. 6 under a condition of a constant output power. It can be understood from FIG. 10 that the motor weight can be reduced without decreasing the output power of the motor when r/w≈0.6±0.1. It is preferable that r/w≈0.6.

The present invention can be applied not only to the case where the shape of the permanent magnet 8 is the arc-shape shown in the another embodiment, but also to cases of various shapes.

Figure 11:
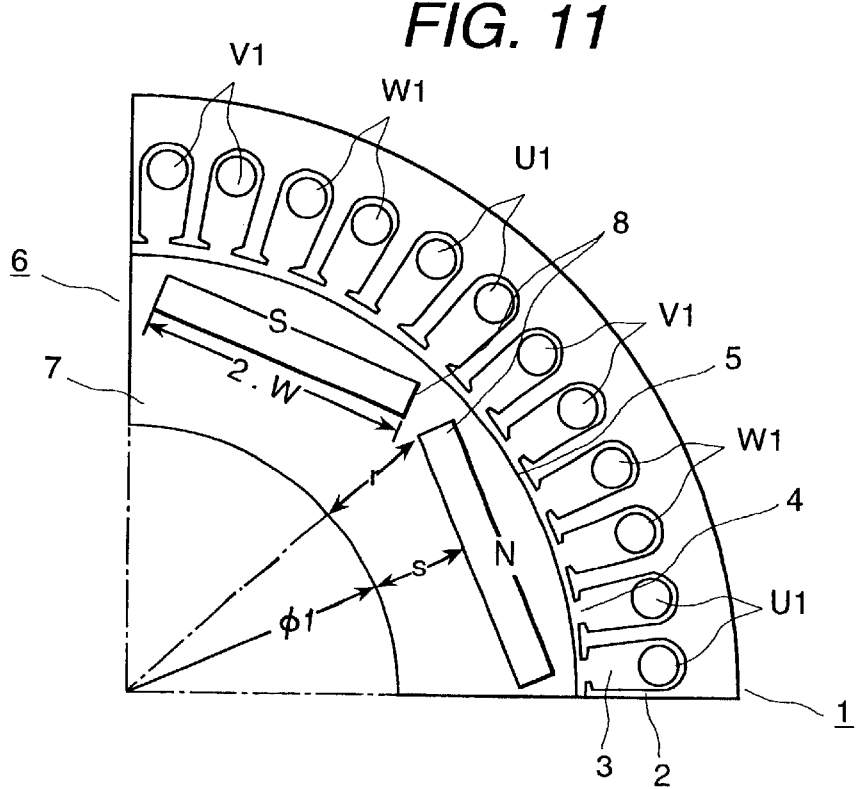
FIG. 11 is a view showing the structure of anther embodiment of a permanent magnet type rotary electric machine in accordance with the present invention.

FIG. 11 shows one pole pair of anther embodiment of a permanent magnet type rotary electric machine in accordance with the present invention in which the shape of the permanent magnet is rectangular. In this case, the shortest distance from the inner diameter surface of the rotor core 7 to the inner diameter surface of the permanent magnet 8 is a value s at the central portion of the magnet, but the characteristic of the motor is not changed even if the shortest distance is s because the magnetic fluxes flow toward both sides. Similarly to the other embodiment, the characteristic changes depending on the distance r in the radial direction from the inner diameter surface of the rotor core 7 to a side end portion between the poles of the inner peripheral surface of the permanent magnet 8, and the condition to reducing the motor weight to minimum is r/w≈0.6, also similarly to the case of the other embodiment.

Figure 12:
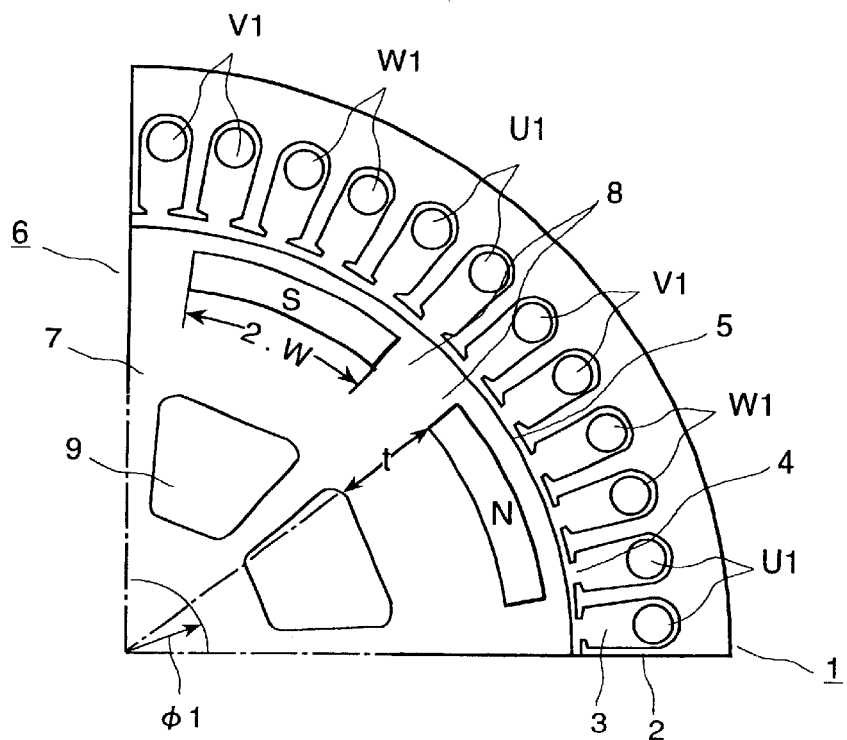
FIG. 12 is a view showing the structure of a further embodiment of a permanent magnet type rotary electric machine in accordance with the present invention.

FIG. 12 shows one pole pair of another embodiment of a permanent magnet type rotary electric machine in accordance with the present invention in which a plurality of die-cut holes 9 (magnetic gaps) are provided in the circumferential direction between the inner diameter surface of the rotor core 7 and the inner peripheral surface of the permanent magnet 8.

In the case of FIG. 12, the severest condition for the magnetic flux flow is in the distance t in the radial direction from the permanent magnet 8 side of each of the die-cut holes 9 to the side end portion between the poles of the inner peripheral surface of each of the permanent magnets 8. The condition to reducing the motor weight to minimum is r/w≈0.6 because the same relationship as that in the other embodiments holds.

Figure 13:
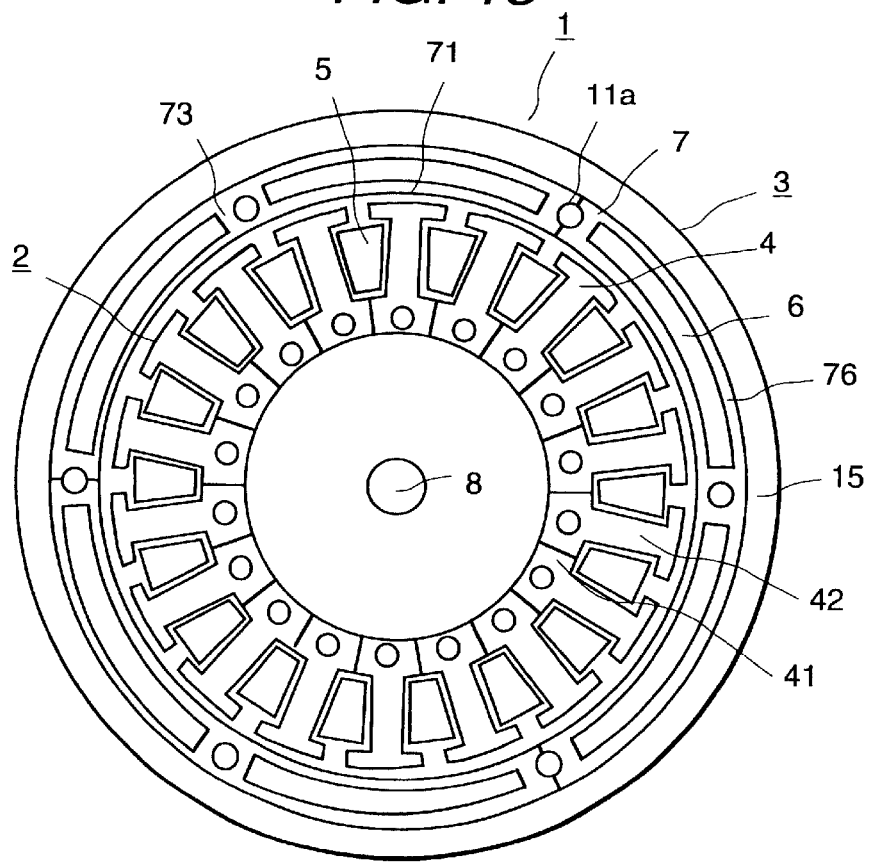
FIG. 13 is a view showing a cross section in the direction perpendicular to the shaft direction of a further embodiment of a permanent magnet type rotary electric machine in accordance with the present invention.

FIG. 13 shows a cross section in the direction perpendicular to the shaft direction of a further embodiment of a rotary electric machine in accordance with the present invention. This embodiment is an example of a rotary electric machine of an outer rotor with embedded magnet type. Therefore, the stator 2 and the rotor 3 of the rotary electric machine 1 are disposed oppositely to that of FIG. 1.

The stator 2 is a divided stator, and is disposed inside. On the other hand, the rotor 3 is composed of a rotor core 7 formed of a magnetic body by laminating, for example, silicon steel plates and a rotor case 15 made of a magnetic material. The rotor core 7 has permanent magnet inserting holes in which the permanent magnets 6 are inserted and placed. Further, projecting magnetic core portion 73 integrally formed with the rotor core 7 are arranged at the both sides of the permanent magnets 6 in the circumferential direction.

The present embodiment is characterized by the rotor being composed of the projecting magnetic core portions 73 arranged in the outer peripheral side of the rotor core 7. The permanent magnets 6 are contained in the rotor core 7. The rotor core yoke portions 76 form paths for magnetic fluxes passing through the projecting magnetic core portions 73 and the permanent magnets 6. The rotor core 7 is divided into six sections in the circumferential direction in the unit of the projecting magnetic core portions 73 and the rotor core yoke portions 76.

Since the rotary electric machine of an outer rotor with embedded magnet type having the above-described structure can use reluctance torque by the projecting pole core portion 73 as well as torque by the permanent magnets 6, similarly to the rotary electric machine of FIG. 5, a high torque and high efficiency rotary electric machine can be obtained.

Further, the present embodiment is characterized by the rotor 2 being formed of units of two poles. The units of two poles are connected through the outer diameter bridges 71, and the units of two poles are assembled by being wound in one turn. The dividing position of the rotor core 7 is selected at a position between the poles of the permanent magnets 6. The mechanical strength of the rotor 2 can be further increased by, in each of the dividing positions of the rotor core 7, slightly displacing the dividing position of each of the magnetic plates composing the rotor core 7 laminated in the shaft direction with respect to the other plates.

Particularly, in this embodiment, the rotor 2 is divided in the unit of two poles and at the middle position of the width in the circumferential direction of the projecting pole core portion 73. Of course, it is possible to divide at the middle position of the width in the circumferential direction of the permanent magnet 6.

The mechanical strength of the rotor core 7 in the outer rotor with embedded magnet structure is not so severe because it is supported by the rotor case 15. Therefore, number of the axial direction fastening and supporting members 11a such as rivets or bolts for the rotor core 7 can be reduced compared to the case of the inner rotor.

By the structure described above, the quantity of material used for the rotor core 7 can be reduced, and the weight of the rotary electric machine can be reduced.

Although the above embodiment describes on the rotary electric machine of the lumped wound winding structure, the present embodiment may be applied to a rotary electric machine of the distributed wound winding structure. Further, the present invention may be applied to a motor or a generator.

Furthermore, the present embodiment may be applied both to a reluctance motor using an outer rotor type rotor and to a reluctance motor using an inner rotor type rotor. The present embodiment may be applied not only to the rotary electric machines but also to a liner motor or the like.

An electric vehicle using an embodiment of the rotary electric machine in accordance with the present invention will be described below, referring to FIG. 14.

Figure 14:
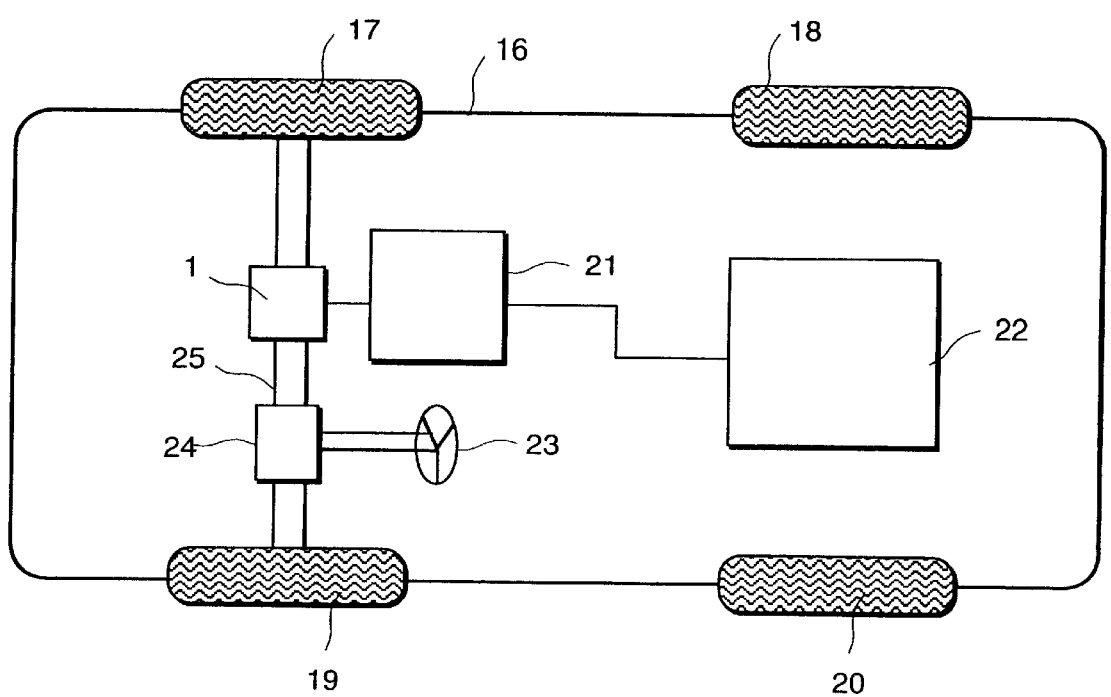
FIG. 14 is a schematic view showing the structure of a drive portion of an electric vehicle mounting the embodiment of the rotary electric machine in accordance with the present invention.

FIG. 14 is a schematic view showing the structure of a drive portion of an electric vehicle mounting an embodiment of the rotary electric machine in accordance with the present invention.

A car body of the electric vehicle is supported by four wheels 17, 18, 18, 20. Since the electric vehicle is of front wheel drive type, the embodiment of the rotary electric machine 1 in accordance with the present invention is directly attached to a front wheel shaft 25.

Driving torque of the rotary electric machine 1 is controlled by a controller 21. A battery 22 is provided as a power source for the controller 21, and electric power from the battery 22 is supplied to the rotary electric machine 1 through the controller 21, and the rotary electric machine 1 outputs drive torque, and then the wheels 17, 19 are rotated by the drive torque. Rotation of a steering wheel 23 is transmitted to the two wheels 17, 19 through a steering gear 24 and a transmitting mechanism composed of a tie rod, knuckle arms and so on to change an angle of the wheels.

By mounting the above-mentioned rotary electric machine 1 on the electric vehicle, the vehicle can be made small in size and light in weight, and a driving distance per charge of the vehicle can be lengthened.

Although the above description is made on an example of the electric vehicle, the same effect can be obtained by mounting the rotary electric machine 1 on a hybrid electric vehicle.

According to the present invention, by improving the material use factor during manufacturing of the rotor core, resources can be effectively used. Further, by making the rotary electric machine small in size and light in weight, the weight of the electric vehicle mounting the rotary electric machine can be reduced, and a driving distance per charge of the electric vehicle can be lengthened, and fuel consuming efficiency can be improved.

Further, according to the present invention, the weight of the motor cab be reduced without decreasing the output power of the motor by making the rotary electric machine so as to satisfy the relation r/w≈0.6±0.1, where r is a distance in a radial direction from an inner radial surface of the rotor core to a side end portion between poles of an inner peripheral surface of each of the permanent magnets, and 2w is a length in the circumferential direction of the permanent magnet.

Furthermore, by using the permanent magnet type rotary electric machine for a hybrid electric vehicle in accordance with the present invention, the weight of the hybrid electric vehicle can be reduced.

What is claimed is:

1. A rotary electric machine comprising a stator having a stator core wound with stator windings; and a rotor having a rotatable rotor core arranged opposite to said stator core through a gap, wherein said rotor core has a number of magnetic poles corresponding to a plurality of projecting poles arranged on a side of said gap and along a circumferential direction of said rotor core and a plurality of rotor yokes, each of said rotor yokes forming a magnetic path for conducting magnetic flux of adjacent ones of said projecting poles, said rotor core being divided in the circumferential direction by the number of magnetic poles of said rotor core into divided rotor core portions, adjacent ones of said divided rotor core portions forming a respective one of said magnetic poles.

2. A rotary electric machine according to claim 1, wherein a position of said division is at each middle position of a width in the circumferential direction of said projecting poles.

3. A rotary electric machine according to claim 2, wherein said rotor core is made of a different material from a material of said stator core.

4. A rotary electric machine according to claim 1, wherein said rotor core is made of a different material from a material of said stator core.

5. A rotary electric machine comprising a stator having a stator core wound with stator windings; and a rotor having a rotatable rotor core arranged opposite to said stator core through a gap, wherein said rotor core has a number of magnetic poles and respectively comprises a plurality of permanent magnets arranged and embedded therein on a side of said gap and along a circumferential direction of said rotor core and a plurality of rotor yokes, each of said rotor yokes forming a magnetic path for conducting magnetic flux of adjacent ones of said permanent magnets, said rotor core being divided in the circumferential direction by the number of magnetic poles of said rotor core into divided rotor core portions, adjacent ones of said divided rotor core portions forming a respective one of said magnetic poles.

6. A rotary electric machine according to claim 5, wherein a position of said division is at each position between the poles of said permanent magnets.

7. A rotary electric machine according to claim 6 wherein said rotor core is made of a different material from a material of said stator core.

8. A rotary electric machine according to claim 5 wherein said rotor core is made of a different material from a material of said stator core.

9. An electric vehicle comprising a battery for supplying electric power; a rotary electric machine for outputting drive torque to drive the vehicle by said supplied electric power; and a controller for controlling said drive torque, wherein said rotary electric machine comprises a stator having a stator core wound with stator windings; and a rotor having a rotatable rotor core arranged opposite said stator core through a gap, and said rotor is formed of a rotor core divided in a circumferential direction of said rotor core in a unit forming each magnetic pole of said rotor core and a holding member having an I-shaped cross section for holding said rotor core, said holding member having an I-shaped cross section being disposed an inner peripheral side of said rotor core in order to lengthen a driving distance per charge of said vehicle by reducing the vehicle weight.

\* \* \* \* \*